United States Patent
Kato et al.

(10) Patent No.: US 10,705,025 B2
(45) Date of Patent: *Jul. 7, 2020

(54) INSPECTION DEVICE

(71) Applicant: DENSO CORPORATION, Kariya, Aichi-pref. (JP)

(72) Inventors: Shinji Kato, Kariya (JP); Katsuhiro Miyagaki, Kariya (JP); Hiroyuki Iwatsuki, Kariya (JP); Masaru Horiguchi, Kariya (JP); Kohei Nakamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/362,840

(22) Filed: Mar. 25, 2019

(65) Prior Publication Data

US 2019/0219516 A1    Jul. 18, 2019

Related U.S. Application Data

(63) Continuation of application No. PCT/JP2017/034897, filed on Sep. 27, 2017.

(30) Foreign Application Priority Data

Sep. 28, 2016   (JP) .................................. 2016-190103

(51) Int. Cl.
*G01N 21/88*   (2006.01)
*G01N 21/89*   (2006.01)
(Continued)

(52) U.S. Cl.
CPC ......... *G01N 21/8806* (2013.01); *G01B 11/26* (2013.01); *G01B 11/30* (2013.01);
(Continued)

(58) Field of Classification Search
CPC ........ G01B 11/26; G01B 11/30; G01N 21/84; G01N 21/88; G01N 21/8806; G01N 21/89;
(Continued)

(56) References Cited

U.S. PATENT DOCUMENTS

2009/0097737 A1    4/2009 Hashimoto et al.
2015/0168365 A1*   6/2015 Connor .................. G01N 33/02
                                                              356/51
(Continued)

FOREIGN PATENT DOCUMENTS

JP       2006148842 A    6/2006
JP       2009086559 A    4/2009
(Continued)

OTHER PUBLICATIONS

U.S. Appl. No. 16/362,775, filed Mar. 25, 2019, Horiguchi et al.
U.S. Appl. No. 16/362,764, filed Mar. 25, 2019, Nakamura et al.
U.S. Appl. No. 16/362,783, filed Mar. 25, 2019, Horiguchi et al.
U.S. Appl. No. 16/362,800, filed Mar. 25, 2019, Nakamura et al.
(Continued)

*Primary Examiner* — Tri T Ton
(74) *Attorney, Agent, or Firm* — Harness, Dickey & Pierce, P.L.C.

(57) ABSTRACT

An inspection device includes a wearable camera attached to a worker that images an inspection object, and a laser pointer that indicates an imaging region of the wearable camera to the worker. The laser pointer is attached to the worker to emit a laser beam in a direction parallel to a line of sight of the wearable camera such that a relative distance between a light point of the laser beam and the imaging region of the wearable camera is constant and does not vary depending on a distance between the laser pointer and the workpiece.

4 Claims, 5 Drawing Sheets

(51) Int. Cl.
*G01B 11/30* (2006.01)
*G01B 11/26* (2006.01)
*H04N 5/225* (2006.01)
*H04N 5/232* (2006.01)
*G02B 27/01* (2006.01)
*G03B 17/56* (2006.01)
*G01N 21/84* (2006.01)

(52) U.S. Cl.
CPC .............. *G01N 21/84* (2013.01); *G01N 21/88* (2013.01); *G01N 21/89* (2013.01); *G02B 27/0172* (2013.01); *G03B 17/561* (2013.01); *H04N 5/2251* (2013.01); *H04N 5/23203* (2013.01); *G02B 2027/0138* (2013.01)

(58) Field of Classification Search
CPC ........ G02B 2027/0138; G02B 27/0172; G03B 17/561; H04N 5/2251; H04N 5/232
USPC ....................... 356/237.1–237.6, 239.1–239.8
See application file for complete search history.

(56) References Cited

U.S. PATENT DOCUMENTS

| | | | |
|---|---|---|---|
| 2016/0112636 A1 | 4/2016 | Yamaguchi et al. | |
| 2016/0191862 A1* | 6/2016 | Yokomitsu | H04N 5/772 |
| | | | 348/158 |
| 2019/0219517 A1* | 7/2019 | Horiguchi | G01N 21/88 |

FOREIGN PATENT DOCUMENTS

| | | |
|---|---|---|
| JP | 2011231602 A | 11/2011 |
| JP | 2016122115 A | 7/2016 |
| JP | 2016122918 A | 7/2016 |
| WO | WO-2007141857 A1 | 12/2007 |

OTHER PUBLICATIONS

U.S. Appl. No. 16/362,823, filed Mar. 25, 2019, Miyagaki et al.
U.S. Appl. No. 16/362,874, filed Mar. 25, 2019, Kato et al.

* cited by examiner

INSPECTION DEVICE

CROSS REFERENCE TO RELATED APPLICATIONS

The present application is a continuation application of International Patent Application No. PCT/JP2017/034897 filed on Sep. 27, 2017, which designated the United States and claims the benefit of priority from Japanese Patent Application No. 2016-190103 filed on Sep. 28, 2016. The entire disclosures of the above applications are incorporated herein by reference.

TECHNICAL FIELD

The present disclosure relates to an inspection device.

BACKGROUND

In the manufacturing process of a product, the quality of an object to be inspected such as a product at an intermediate stage (hereinafter referred to as "workpiece") or a finished product may be visually inspected by a worker. In this case, a wearable camera may support the inspection work by capturing images.

SUMMARY

An inspection device according to the present disclosure may include a wearable camera, attached to a worker, that images an inspection object, and an indication unit that indicates an imaging region of the wearable camera to the worker.

DETAILED DESCRIPTION

Figure 1:
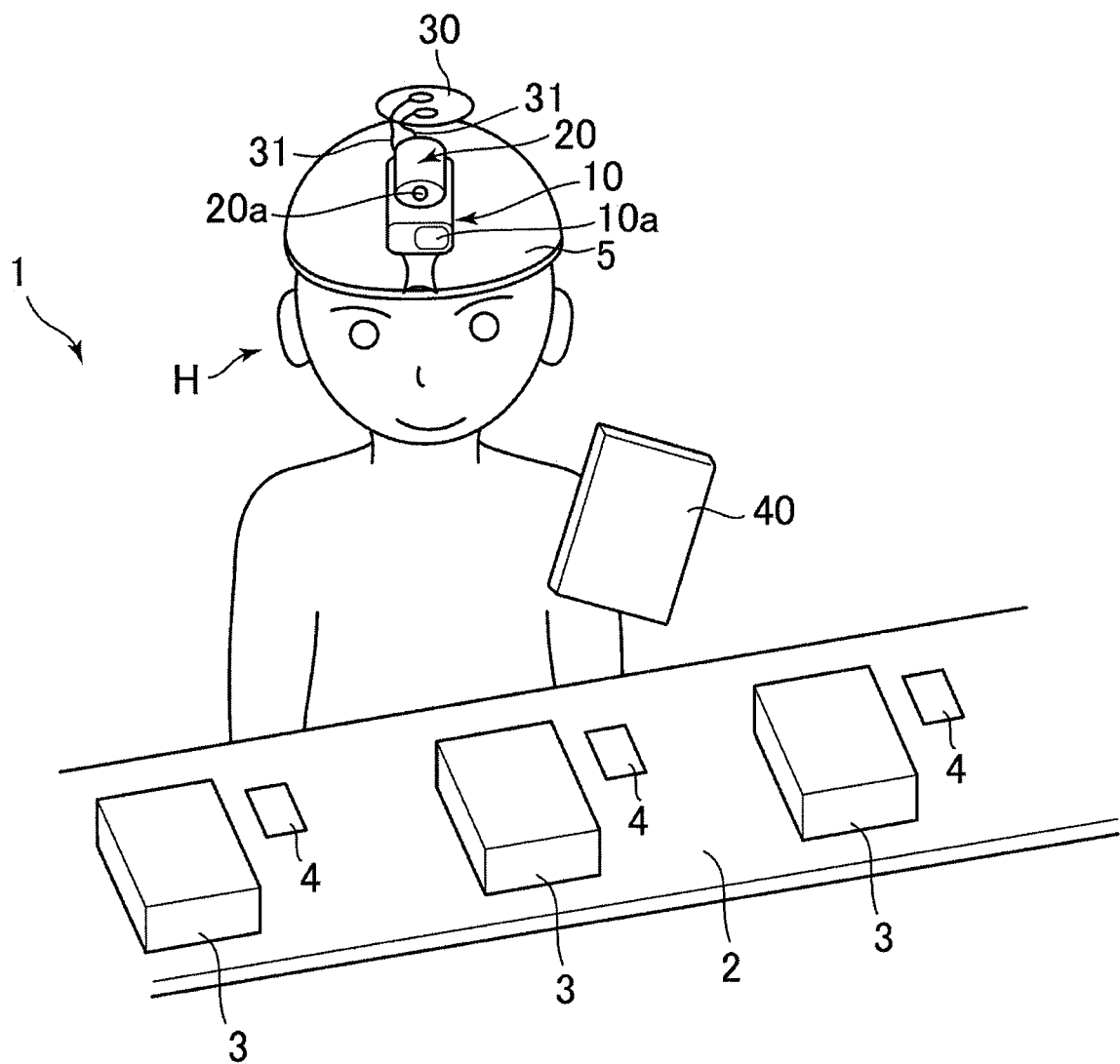
FIG. 1 is a diagram schematically showing a schematic configuration of an inspection device according to a first embodiment and an example of an inspection work to which an inspection device is applied.

Hereinafter, the present embodiments will be described with reference to the attached drawings. In order to facilitate the ease of understanding, the same reference numerals are attached to the same constituent elements in each drawing where possible, and redundant explanations are omitted.

First Embodiment

A first embodiment will be described hereafter with reference to FIGS. 1 to 4. First, with reference to FIG. 1 and FIG. 2, an example of an inspection work to which an inspection device 1 according to the first embodiment is applied and a schematic configuration of the inspection device 1 will be described.

The inspection device 1 according to the first embodiment is used in the manufacturing process of a product such as a heat exchanger. Specifically, the inspection device 1 is used in an inspection work for judging whether or not an object to be inspected, such as the workpiece 3 at an intermediate manufacturing stage or a finished product, are good products. As an example such inspection work, for example, the configuration shown in FIG. 1 is provided.

A worker H of the inspection work inspects whether or not the workpieces 3 sequentially conveyed by a conveyor 2 are good. The conveyor 2 carries a plurality of sets of workpieces 3 and signboards 4 and conveys these sets so that each set is positioned in front of the worker H in sequence. The signboard 4 is arranged near its corresponding workpiece 3, and a code indicating the type of the workpiece 3 is displayed on that signboard 4.

Figure 2:
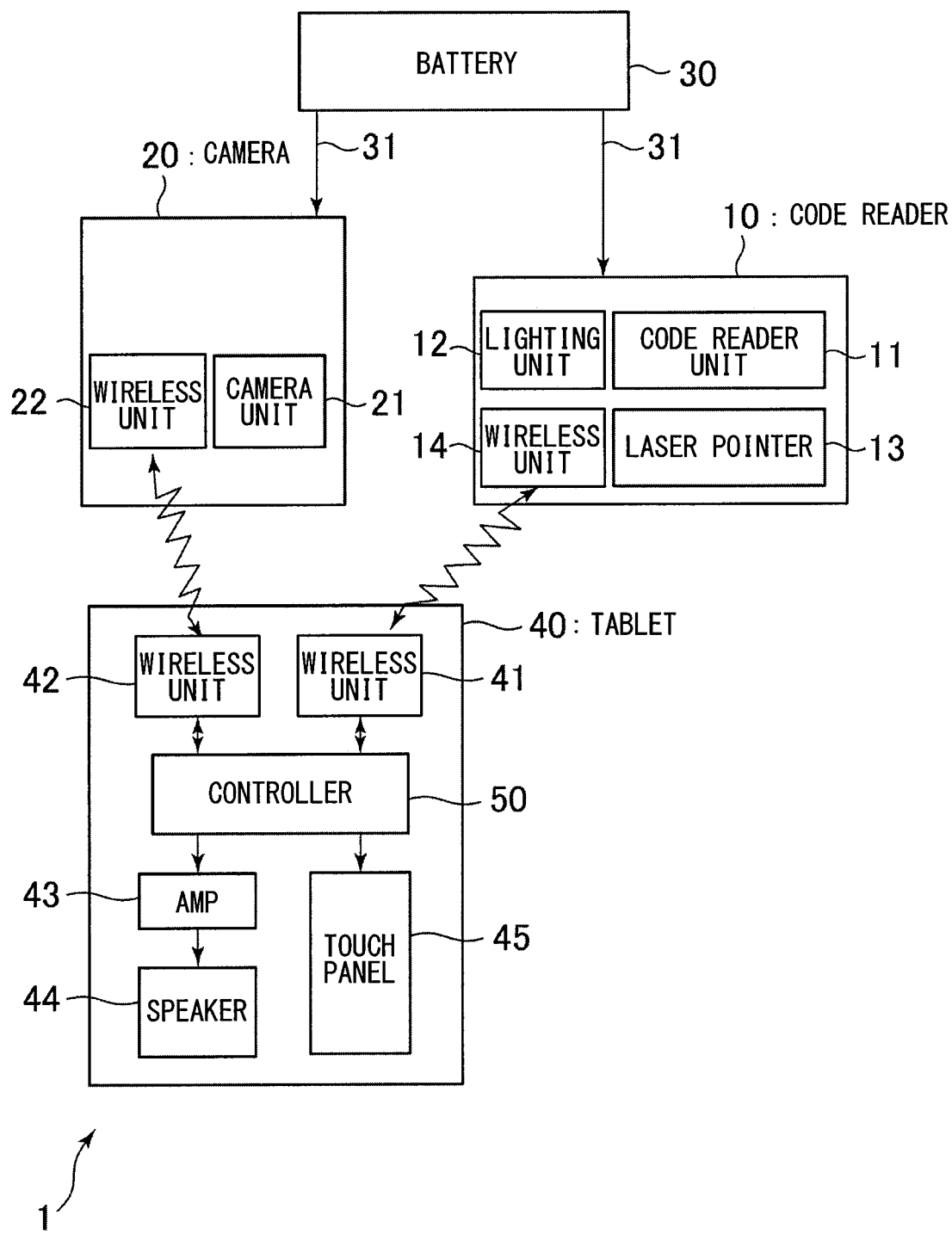
FIG. 2 is a block diagram showing a configuration of an inspection device according to the first embodiment.

The worker H can perform the above-described inspection work using the inspection device 1 of the present embodiment. As shown in FIGS. 1 and 2, the inspection device 1 includes a code reader 10, a wearable camera 20, a battery 30, and a tablet 40.

As shown in FIG. 2, the code reader 10 includes a code reader unit 11, a lighting unit 12, a laser pointer 13, and a wireless unit 14.

The code reader unit 11 a well known optical code reader including a light source that irradiates light. Light is emitted from the light source through lens 10a, reflected by the signboard 4, and received through the lens 10a. The code reader unit 11 reads this reflected light to read codes. Here, the signboard 4 of the present embodiment is a display board on which a code is displayed. The code is an identification indicator indicating the type of the workpiece 3. Various codes, such as a QR code (registered trademark) or a bar code, may be used as the code.

The lighting unit 12 illuminates the workpiece 3 and its surroundings through the lens 10a.

The laser pointer 13 irradiates a laser beam as a pointer (light spot) through the lens 10a. Thus, the laser pointer 13 assists the worker H to recognize a target reading area in which the code reader unit 11 reads codes. In the present embodiment, the region irradiated with the laser beam by the laser pointer 13 is set to coincide with the target reading area of the code reader unit 11.

The wireless unit 14 is composed of an antenna, a wireless circuit, and the like, and wirelessly communicates with the wireless unit 41 of the tablet 40.

The wearable camera 20 is a compact camera which is attached to a body or the like and is intended to capture images in a hands-free manner. As shown in FIG. 2, the wearable camera 20 includes a camera unit 21 and a wireless unit 22. The camera unit 21 captures images of the workpiece 3 as an target imaging object using the light received via lens 20a. The wireless unit 22 is composed of an antenna, a wireless circuit, and the like, and wirelessly communicates with the wireless unit 42 of the tablet 40.

The battery 30 is a secondary battery that supplies direct current power to the code reader 10 and the camera 20 via a harness 31 or the like.

In the present embodiment, as shown in FIG. 1, the code reader 10, the wearable camera 20, and the battery 30 are mounted on a hat 5 to be work by the worker H. Further, the code reader 10 and the wearable camera 20 are installed on the hat 5 of the worker H so that the lens 10a of the code reader 10 and the lens 20a of the wearable camera 20 are disposed facing the front of the worker H.

The tablet 40 is a portable terminal configured to be carried by the worker H. As shown in FIG. 2, the tablet 40 includes wireless units 41 and 42, an amplifier 43, a speaker 44, a touch panel 45, and a controller 50.

The wireless units 41 and 42 are composed of an antenna, a wireless circuit, and the like. The wireless unit 41 wirelessly communicates with the wireless unit 14 of the code reader 10. The wireless unit 42 wirelessly communicates with the wireless unit 22 of the wearable camera 20. In the present embodiment, various types of short range wireless communications may be used for wireless communication between the wireless units. Bluetooth (registered trademark) or Wi-Fi (registered trademark) can be used as the short-range wireless communication.

The amplifier 43 amplifies the voltage of the analog signal output from the controller 50 and outputs an amplified signal. The speaker 44 converts the amplified signal output from the amplifier 43 into sound and outputs the sound. The touch panel 45 is a display device combining a transparent key input operation unit and a display panel.

The controller 50 is a device that controls the operation of each part of the inspection device 1 related to the above-described inspection work. The controller 50 is physically a microcontroller composed of a CPU, a memory, digital-analog conversion circuits, and the like. The controller 50 executes an inspection process in accordance with a computer program stored in advance in the memory. The inspection process is a determination process of determining whether or not the workpiece 3 is a non-defective product based on the code acquired from the code reader 10 and the captured image acquired by the wearable camera 20.

In the memory, a plurality of kinds of reference images are stored in advance. The reference images include still images or videos, and are used for determining whether or not the workpiece 3 is a non-defective item. Each reference image includes a non-defective product image showing a workpiece 3 which is a non-defective product and a defective product image showing a defective workpiece 3. The digital-analog conversion circuit outputs an analog signal representing a sound based on a command of the CPU.

In the present embodiment, the tablet 40 is carried by the worker H, for example, stored in a pocket of the worker H, or is placed in the vicinity of the worker H.

By using the inspection device 1 configured in this way, the a standard work of the inspection process (hereinafter referred to as "standard work) of the workpiece 3 performed by the worker H may be, for example, the following procedure.

First, the worker H directs their head to face the signboard 4, so that the code reader 10 attached to the hat 5 reads the code from the signboard 4. Next, the head is directed to face the workpiece 3, and the wearable camera 20 attached to the hat 5 likewise captures the image of the workpiece 3 to acquire the captured image. That is, using the code reader 10 reading the code from the signboard 4 as a trigger, the wearable camera 20 acquires the captured image of the workpiece 3. The tablet 40 receives the code from the code reader 10 via wireless communication and receives the captured image from the wearable camera 20.

The controller 50 in the tablet 40 selects the reference image corresponding to the received code from the plurality of types of reference images stored in advance in the memory as described above. The controller 50 compares the captured image of the workpiece 3 with the reference image to determine whether or not the workpiece 3 is a non-defective product. In addition, the controller 50 notifies the worker H of the result of pass/fail determination of the workpiece 3 via sound information or visual information using the speaker 44 of the tablet 40 or the touch panel 45 of the tablet 40.

The worker H continues to the next work based on the information of the determination result outputted from the tablet 40. For example, if it is determined that the workpiece 3 is a non-defective product, the next workpiece 3 on the conveyor 2 is inspected.

The inspection device 1 configured as described above is carried by the worker H as a wearable device so that both hands of the worker H are free. With the above configuration, the inspection device 1 can automatically perform the inspection work for the inspection object without requiring any operation using the hands of the worker H, and supports the inspection work of the worker H so that the burden on the worker H can be reduced. In addition, since the worker H is in a hands-free state during the inspection work, the worker H can perform other work (such as screw tightening) aside from the inspection while performing the inspection work of the workpiece 3, and efficiency can be improved.

Meanwhile, as one type of the above described inspection work, there is a visual confirmation operation in which the worker H visually checks whether information such as a serial number on a part of the surface of the workpiece 3 is acceptable or not. During the visual inspection accompanied by such a visual confirmation operation, there is a need to reduce work burden on the worker H, in which an image including the visual confirmation target 3A (see FIG. 3) is automatically recorded as a work record by using the wearable camera 20 attached to the worker H. Therefore, in the present embodiment, by using the above-described inspection device 1, it is possible to configure the wearable camera 20 attached to the worker H to perform the task of automatically capturing images during the visual inspection.

Figure 3:
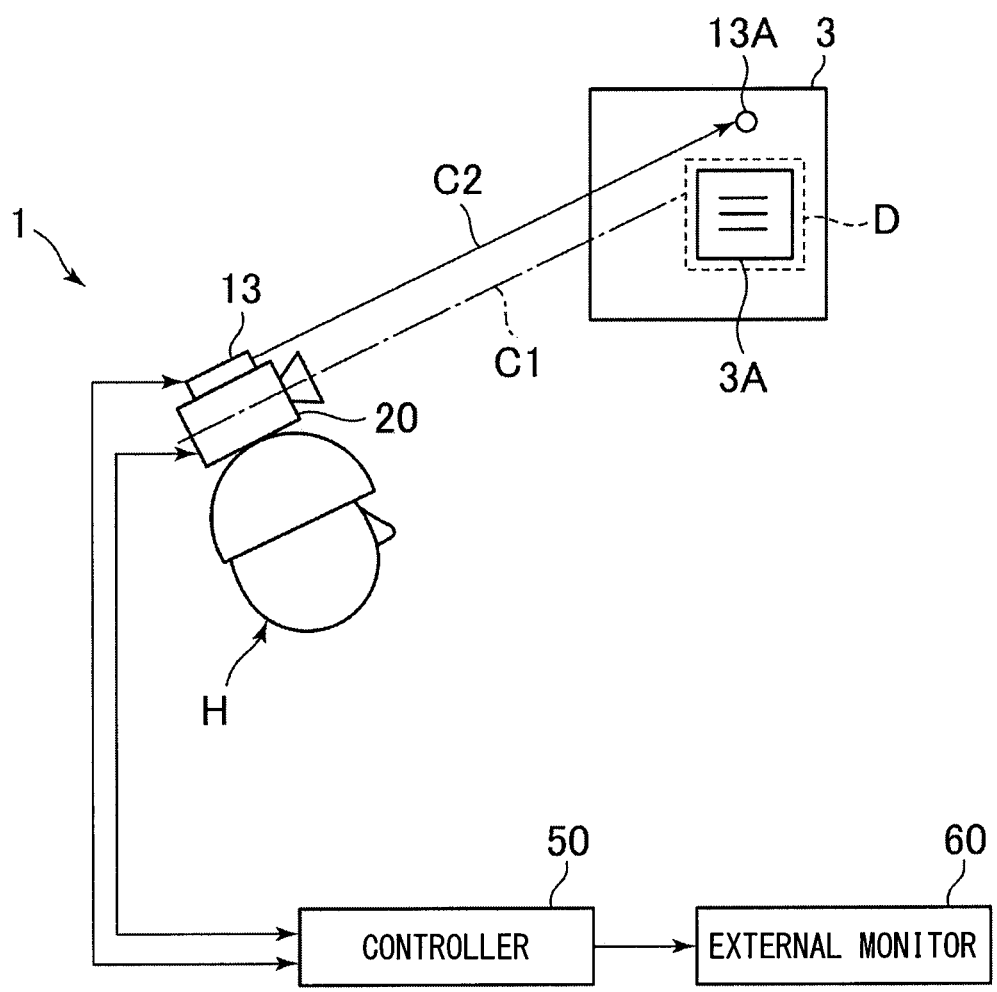
FIG. 3 is a schematic diagram for explaining the installation of a wearable camera and a laser pointer in the inspection device according to the first embodiment.

In the inspection device 1 according to the first embodiment, as shown in FIG. 3, in association with this task, the laser pointer 13 is attached to the worker H such that the laser beam C2 of the laser pointer 13 is emitted in a direction parallel to a line of sight C1 of the wearable camera 20. Due to this, the relative distance between the light spot 13A, which is formed when the surface of the workpiece 3 is irradiated with the laser beam C2, and an imaging region D of the wearable camera 20 is fixed, and does not vary depending on the distance from the laser pointer 13 and the wearable camera 20 to the workpiece 3. In FIG. 3, the frame of the imaging region D of the wearable camera 20 is virtually shown as a dotted line around the visual confirmation target 3A.

By attaching the laser pointer 13 and the wearable camera 20 as described above, the worker H can accurately grasp the position of the imaging region D of the wearable camera 20 during visual inspection by referencing the light spot 13A of the laser pointer 13. Accordingly, it is possible to easily ensure that the object 3A is inside the imaging region D. That is, in the first embodiment, the laser pointer 13 also functions as a indication unit for indicating the imaging region D of the wearable camera 20 to the worker H.

In addition, during the task of automatic inspection of visual inspection, the controller 50 of the inspection device 1 can display the image acquired from the wearable camera 20 on the touch panel 45 of the tablet 40 as well as on an external monitor 60.

Figure 4:
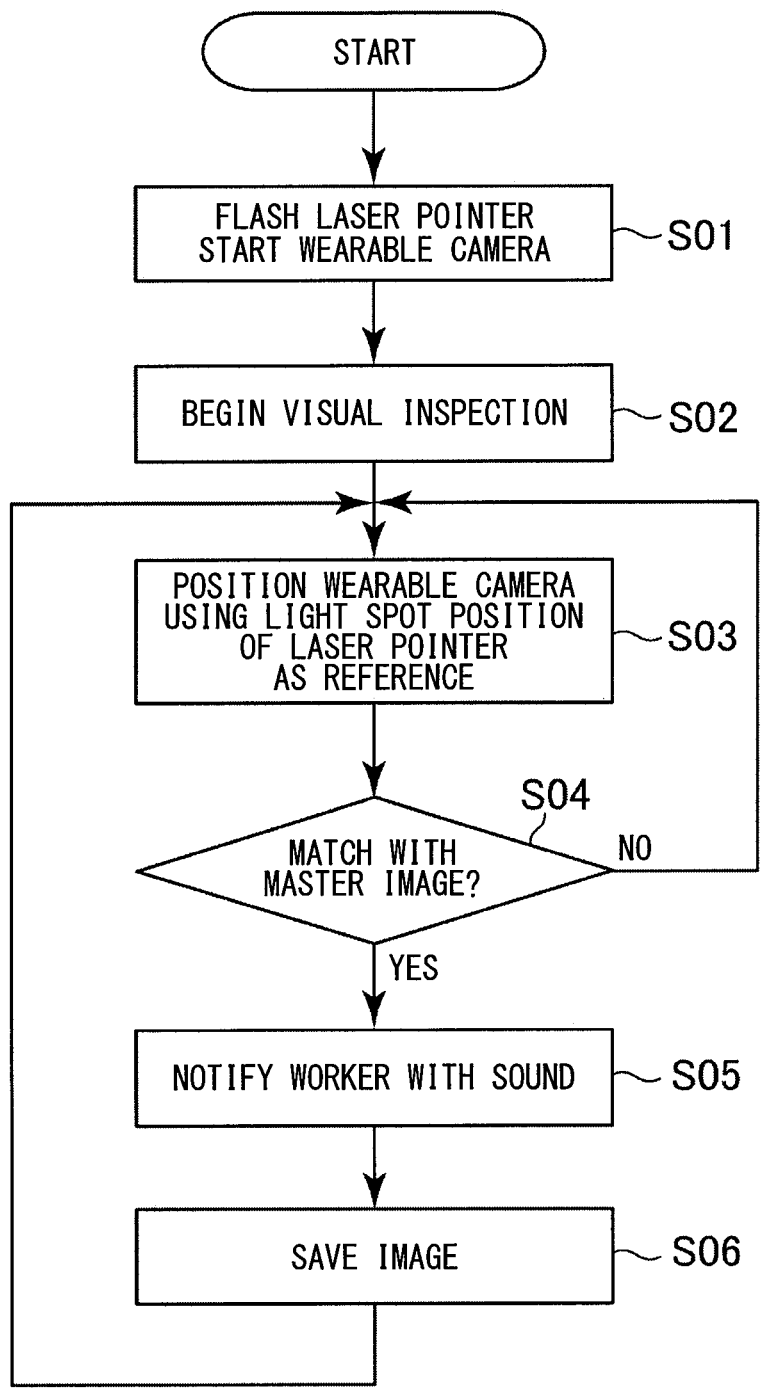
FIG. 4 is a flowchart of automatic recording processing at the time of visual inspection.

With reference to FIG. 4, the procedure of automatic recording processing for visual inspection will be described. The control and processing aspects in the flowchart shown in FIG. 4 is executed by the controller 50 of the inspection device 1.

In step S01, the flashing of the laser pointer 13 is started, and the wearable camera 20 is started. In step S02, the worker H begins visual inspection. During the visual inspection of the workpiece 3, the laser pointer 13 is configured to repeatedly change between a lit state and an unlit state at predetermined intervals. In addition, the wearable camera 20 is configured to continuously output the captured image to the controller 50 during visual inspection. Upon completion of the processing in steps S01 and S02, the processing proceeds to step S03.

In step S03, the worker H performs the visual inspection work for the target 3A on the workpiece 3, and at the same time, the worker H orients the wearable camera 20 based on the position of the light spot 13A from the laser pointer 13 such that the visual confirmation target 3A is positioned within the imaging region D of the wearable camera 20. As described above, in the present embodiment, the relative distance between the position of the light spot 13A of the laser pointer 13 and the imaging region D of the wearable camera 20 is set to be constant. For example, as shown in FIG. 3, the imaging region D may be set to be just below the position of the light spot 13A. Thus, if the worker H knows in advance the positional relationship between the light spot 13A and the imaging region D, the worker H is able to easily ensure that the entire target 3A is positioned inside the imaging region D of the wearable camera 20 by adjusting the visible position of the light spot 13A of the laser pointer 13 to be just above the target 3A. Upon completion of the process of step S03, the process proceeds to step S04.

In step S04, it is determined whether or not the image acquired from the wearable camera 20 after being aligned in step S03 matches a predetermined master image. The master image may be, for example, an image including a characteristic amount related to the visual appearance of the visual confirmation target 3A. In this step, it is not always necessary for the obtained image to perfectly match the master image. For example, in the case where the outer frame of the target 3A included in the master image is completely contained within the acquired image, the acquired image may be determined as matching the master image even in the case of a partial match. As a result of the determination in step S04, when the acquired image matches the master image (Yes in step S04), the process proceeds to step S05. If the obtained image does not match the master image (No in step S04), the process returns to step S03. Then, steps S03 and S04 are repeated until the worker H readjusts the position of the target 3A so that the target 3A is positioned within the imaging region D of the wearable camera 20.

In step S05, as a result of the determination in step S04, the image acquired from the wearable camera 20 matches with the predetermined master image and the target 3A is within the imaging region D of the wearable camera 20. Accordingly, these facts are notified to the worker H by sound via the speaker 44. Upon completion of the process of step S05, the process proceeds to step S06.

In step S06, the image acquired from the wearable camera 20 is stored. The controller 50 may store the acquired image in an internal memory or in a different, external device. Further, the controller 50 can also display the recorded image on the touch panel 45 of the tablet 40 or on the external monitor 60. Upon completion of the process in step S06, the process returns to step S03, and the processes in steps S03 to S06 are repeated until visual inspection is completed.

Next, effects of the inspection device 1 according to the first embodiment will be described. The inspection device 1 according to the first embodiment includes the laser pointer 13 as an indication unit for indicating the imaging region D of the wearable camera 20 to the worker H. Due to this, the imaging region D of the wearable camera 20 can be clearly indicated to the worker H. As a result, the worker H is able to easily position the target 3A, which is necessary for the work record of the inspection work, within the imaging region D of the camera. Thus, it is possible to improve the accuracy with which the target 3A is properly imaged. As a result, the wearable camera 20 can perform imaging of the target 3A easily and accurately during the inspection work.

Further, according to the inspection device 1 of the first embodiment, the laser pointer 13 as an indication unit is attached to the worker H such that the laser pointer 13 emits the laser beam C2 in a direction parallel to the line of sight C1 of the wearable camera 20, and the relative distance between the light point 13A of the laser beam C2 and the imaging region D of the wearable camera 20 is constant, i.e., does not vary depending on the distance between the inspection device 1 and the workpiece 3.

With this configuration, it is possible for the worker H to easily ascertain the imaging region D of the wearable camera 20 by using the position of the light spot 13A of the laser pointer 13 as a guide. Further, even if the distance from the laser pointer 13 and the wearable camera 20 to the workpiece 3 including the visual confirmation target 3A changes due to differences in the work environment of the visual inspection, relative distance between the light spot 13A of the laser pointer 13 and the imaging region D of the wearable camera 20 is constant. Accordingly, the inspection work can still be carried out without deterioration in work accuracy, and therefore versatility is improved.

Further, in the inspection device 1 according to the first embodiment, the laser pointer 13 repeatedly changes between a lit state and an unlit state at predetermined intervals during the inspection operation (for example, the above-described visual inspection) of the workpiece 3. Due to this, for example by capturing the image data at the time of turning off the laser pointer 13, it is possible to prevent the reflection of the light spot 13A of the laser pointer 13 from being captured, and as a result the quality of the recorded image can be improved.

In addition, the inspection device 1 according to the first embodiment is provided with the external monitor 60 for displaying the image captured by the wearable camera 20. Due to this, the state of the inspection work can be provided to personnel other than the worker H. For example, by performing double check or the like, it is possible to further improve the accuracy of the inspection work.

Second Embodiment

Figure 5:
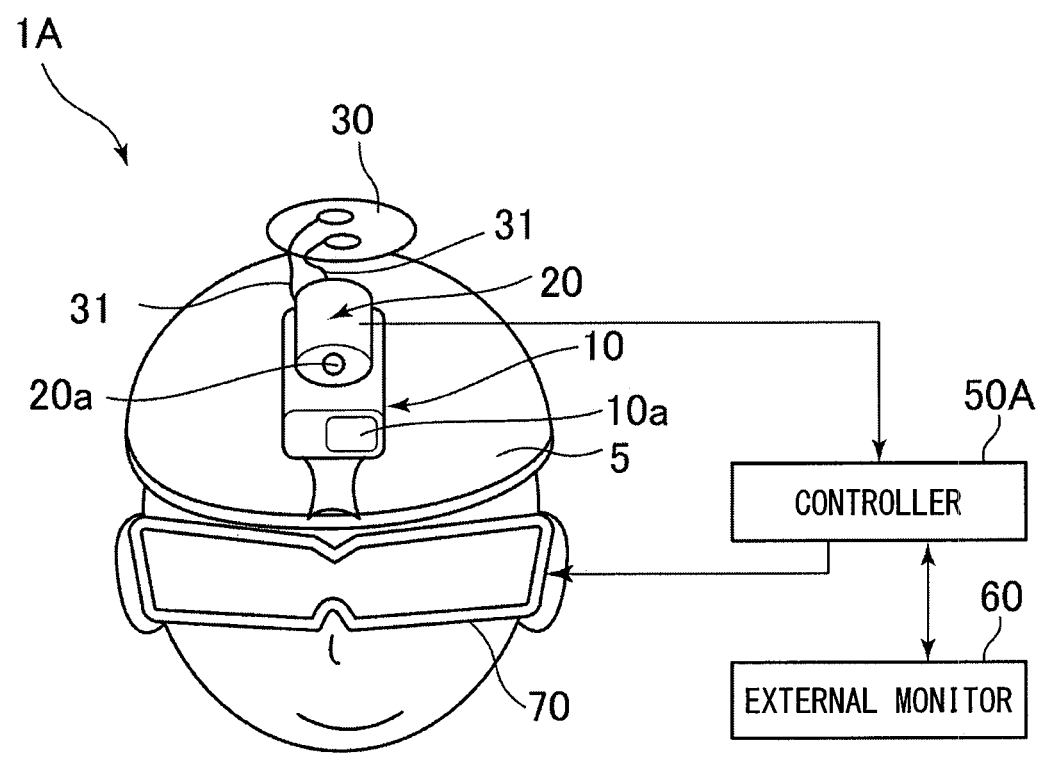
FIG. 5 is a diagram showing a schematic configuration of an inspection device according to a second embodiment.

The second embodiment will be described with reference to FIG. 5. As shown in FIG. 5, in the inspection device 1A according to the second embodiment differs from the inspection device 1 of the first embodiment in that a head mounted display 70 is used as an indication unit for indicating the imaging region D of the wearable camera 20 to the worker H.

The head mounted display 70 is attached to the worker H. The controller 50A of the inspection device 1A controls the head mounted display 70 to display the image captured by the wearable camera 20. As a result, as the worker H performs the visual confirmation work, the worker H is able to see the image displayed on the head mounted display 70 while adjusting the direction of the wearable camera 20 such that the visual confirmation target 3A is positioned inside the imaging region D of the wearable camera 20.

In the case of the configuration of the second embodiment, in step S03 of FIG. 4, the worker H can position the wearable camera 20 by using the head mounted display 70 as described above. Further, the controller 50A can also output the image captured by the wearable camera 20 to the external monitor 60.

The inspection device 1A according to the second embodiment is identical to the inspection device 1 of the first embodiment in that it includes an indication section (head mounted display 70) for indicating the imaging region D of the wearable camera 20 to the worker H. Accordingly, similar to the first embodiment, an effect is exhibited in that it is possible for the wearable camera 20 to easily and accurately capture images of the target 3A during inspection work. Furthermore, since the image captured by the wearable camera 20 can be directly presented to the worker H via the head mounted display 70, the worker H is able to more intuitively adjust the position of the wearable camera 20.

The present embodiment has been described above with reference to the specific examples. However, the present disclosure is not limited to those specific examples. Those specific examples subjected to an appropriate design change by those skilled in the art are also encompassed in the scope of the present disclosure as long as the changed examples have the features of the present disclosure. Each element included in each of the specific examples described above and the placement, condition, shape, and the like of each element are not limited to those illustrated, and can be changed as appropriate. The combinations of elements included in each of the above described specific examples can be appropriately modified as long as no technical inconsistency occurs.

The details of the inspection work to which the inspection device 1, 1A according to the embodiments described with reference to FIG. 1 and FIG. 2 are applied and the specific configurations of the inspection device 1, 1A are merely examples and are not limited to those shown in FIGS. 1 and 2. For example, in the above described embodiments, the inspection object to be inspected for pass/fail determination is the workpiece 3 which is the product at an intermediate stage of production, but completed products can also be included.

In the above-described embodiment, the target 3A of the visual confirmation work described with reference to FIGS. 3 and 4 has been described by way of example as a manufacturing number or the like on a part of the surface of the workpiece 3. However, the target 3A is not limited to this example, and may instead be, for example, a shape or surface property of the workpiece 3, or may be various types of meters or the like for performing maintenance checks in the factory.

Further, the visual inspection work described with reference to FIGS. 3 and 4 is only one example for the application of the indication unit (laser pointer 13, head mounted display 70) which indicates the imaging region D of the wearable camera 20 to the worker H. The indication unit is not limited to being applied to this, and may be used for other types of inspection work.

In the above described embodiments, the wearable camera 20 is installed on the head of the worker H. However, the installation position of the wearable camera 20 is not limited to the head, but may be an arm portion, a hand portion, a midsection, or any arbitrary part of the body of the worker H.

The invention claimed is:

1. An inspection device used by a worker for inspection of an inspection object, comprising:
   a wearable camera attached to the worker that images the inspection object;
   an indication unit that indicates an imaging region of the wearable camera to the worker;
   wherein
      the indication unit includes a laser pointer, and
      the laser pointer is attached to the worker to emit a laser beam in a direction parallel to a line of sight of the wearable camera such that a relative distance between a light point of the laser beam and the imaging region of the wearable camera is constant and does not vary depending on a distance between the laser pointer and the inspection object.

2. The inspection device according to claim 1, wherein the laser pointer repeatedly switches between a lit state and an unlit state at predetermined intervals during the inspection of the inspection object.

3. The inspection device according to claim 1, wherein the indication unit includes a head mounted display attached to the worker.

4. The inspection device according to claim 1, further comprising:
   an external monitor that displays images captured the wearable camera.

* * * * *